(12) United States Patent
Kuczek et al.

(10) Patent No.: US 10,384,914 B2
(45) Date of Patent: Aug. 20, 2019

(54) ELEVATOR SUPPORT STRUCTURE

(71) Applicant: OTIS ELEVATOR COMPANY, Farmington, CT (US)

(72) Inventors: Andrzej Ernest Kuczek, Bristol, CT (US); Richard J. Ericson, Southington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 207 days.

(21) Appl. No.: 15/258,668

(22) Filed: Sep. 7, 2016

(65) Prior Publication Data

US 2017/0073193 A1 Mar. 16, 2017

Related U.S. Application Data

(60) Provisional application No. 62/216,695, filed on Sep. 10, 2015.

(51) Int. Cl.
*H02K 41/02* (2006.01)
*B66B 11/04* (2006.01)
*B66B 7/02* (2006.01)
*H02K 41/03* (2006.01)
*B66B 9/00* (2006.01)
*H02K 7/08* (2006.01)

(52) U.S. Cl.
CPC ............ *B66B 11/0407* (2013.01); *B66B 7/02* (2013.01); *H02K 41/031* (2013.01); *B66B 9/003* (2013.01); *H02K 7/08* (2013.01)

(58) Field of Classification Search
CPC .............................................. H02K 41/31–33
See application file for complete search history.

(56) References Cited

U.S. PATENT DOCUMENTS

| | | | |
|---|---|---|---|
| 3,585,423 A | 6/1971 | Bolton et al. | |
| 3,667,398 A | 6/1972 | English | |
| 4,642,493 A | 2/1987 | Wallace | |
| 5,141,082 A * | 8/1992 | Ishii | B66B 11/0407 187/289 |
| 5,174,416 A | 12/1992 | Sakabe et al. | |
| 5,207,295 A * | 5/1993 | Bialy | B66B 11/0226 160/351 |
| 5,469,030 A * | 11/1995 | Takei | B60L 13/03 318/135 |
| 5,547,059 A * | 8/1996 | Watanabe | B66B 5/18 187/288 |
| 5,668,421 A | 9/1997 | Gladish | |

(Continued)

FOREIGN PATENT DOCUMENTS

GB 2281664 A 3/1995

*Primary Examiner* — Alexander Talpalatski
(74) *Attorney, Agent, or Firm* — Cantor Colburn LLP

(57) ABSTRACT

A secondary portion of a linear electromagnetic propulsion system is configured to propel an elevator car disposed in a hoistway that is defined by a stationary structure. The secondary portion includes a first permanent magnet assembly extending longitudinally along the hoistway. A plurality of support structures of the secondary portion are engaged to and extend between the elevator car and the first permanent magnet assembly. The support structures are further spaced from one-another along the hoistway. A housing extends between and substantially envelopes the plurality of support structures for structural support.

14 Claims, 6 Drawing Sheets

(56) References Cited

U.S. PATENT DOCUMENTS

| | | | |
|---|---|---|---|
| 6,189,657 B1* | 2/2001 | Jessenberger | B66B 11/0407 |
| | | | 187/289 |
| 6,892,649 B2* | 5/2005 | Tent | B66B 11/0407 |
| | | | 104/88.01 |
| 7,261,186 B2 | 8/2007 | Deplazes et al. | |
| 7,375,479 B2* | 5/2008 | Van Eijk | F16C 32/0444 |
| | | | 318/135 |
| 7,924,128 B2* | 4/2011 | Ito | B66B 1/3476 |
| | | | 310/12.11 |
| 8,427,015 B2* | 4/2013 | Hoshi | H02K 41/031 |
| | | | 310/12.15 |
| 9,048,707 B2* | 6/2015 | Chang | H02K 41/031 |
| 9,178,406 B2* | 11/2015 | Hoshi | H02K 41/031 |
| 2004/0173411 A1* | 9/2004 | Silberhorn | B66B 7/047 |
| | | | 187/277 |
| 2008/0223666 A1* | 9/2008 | Cuthbert | B66B 11/0407 |
| | | | 187/288 |
| 2014/0203668 A1* | 7/2014 | Yanagi | H02K 41/031 |
| | | | 310/12.15 |
| 2016/0046464 A1* | 2/2016 | Piech | B66B 9/003 |
| | | | 187/249 |
| 2016/0083226 A1* | 3/2016 | Piech | B66B 11/0407 |
| | | | 187/250 |

* cited by examiner

ELEVATOR SUPPORT STRUCTURE

CROSS REFERENCE TO RELATED APPLICATION

This application claims priority to U.S. Provisional Patent Application No. 62/216,695, filed Sep. 10, 2015, the entire contents of which is incorporated herein by reference.

BACKGROUND

The present disclosure relates to elevator systems, and more particularly to an elevator support structure as an integral part of a propulsion system.

Self-propelled elevator systems (as one example), also referred to as ropeless elevator systems, are useful in certain applications (e.g., high rise buildings) where the mass of the ropes for a roped system is prohibitive and there is a desire for multiple elevator cars to travel in a single lane. Such ropeless elevator systems may propel the elevator cars via an electro-magnetic, linear, propulsion system. Excess weight of an elevator car may be detrimental toward efficient elevator system operation. In contrast, maximizing support structure strength, such as the support structure which supports permanent magnets of the propulsion system is desirable. Further developments in reducing support structure weight and/or optimizing support structure strength is desirable.

SUMMARY

A secondary portion of a linear electromagnetic propulsion system configured to propel an elevator car disposed in a hoistway defined by a stationary structure, the secondary portion according to one, non-limiting, embodiment of the present disclosure includes a first permanent magnet assembly extending longitudinally along the hoistway; a plurality of support structures each engaged to and extending between the elevator car and the first permanent magnet assembly and spaced from one-another along the hoistway; and a housing extending between and substantially enveloping the plurality of support structures for structural support.

Additionally to the foregoing embodiment, the secondary portion includes a second permanent magnet assembly spaced from and opposing the first permanent magnet assembly, and wherein the each support structure of the plurality of support structures are generally C-shaped having a first leg projecting outward from the elevator car for supporting the first permanent magnet assembly and a second leg projecting outward from the elevator car for supporting the second permanent magnet assembly.

In the alternative or additionally thereto, in the foregoing embodiment, each one of the plurality of support structures include a first leg projecting outward from the elevator car for supporting the first permanent magnet assembly and each first leg includes substantially opposite first and second faces, and the housing includes a first member having a first panel engaged to the first face and a second panel engaged to the second face.

In the alternative or additionally thereto, in the foregoing embodiment, the secondary portion includes a second permanent magnet assembly extending longitudinally along the hoistway and spaced laterally away from the second permanent magnet assembly; and wherein each one of the plurality of support structures include a second leg projecting outward from the elevator car for supporting the second permanent magnet assembly and each second leg includes substantially opposite third and fourth faces, and the housing includes a second member having a third panel engaged to the third face and a fourth panel engaged to the fourth face.

In the alternative or additionally thereto, in the foregoing embodiment, the first and second permanent magnet assemblies are engaged to respective and opposing second and third panels.

In the alternative or additionally thereto, in the foregoing embodiment, each one of the plurality of support structures include a base engaged to and projecting between the first and second legs.

In the alternative or additionally thereto, in the foregoing embodiment, the housing includes a fifth panel extending longitudinally along the hoistway, spanning laterally between the second and third panels and engaged to each one of the bases of the plurality of support structures.

In the alternative or additionally thereto, in the foregoing embodiment, the fifth panel is engaged to the second and third panels.

In the alternative or additionally thereto, in the foregoing embodiment, the housing includes a sixth panel extending longitudinally along the hoistway, and engaged to and disposed between the plurality of support structures and the elevator car.

In the alternative or additionally thereto, in the foregoing embodiment, the first and second members are substantially channel-shaped.

In the alternative or additionally thereto, in the foregoing embodiment, the sixth panel includes opposite first and second flanges projecting away from the elevator car and engaged to the respective first and fourth panels.

In the alternative or additionally thereto, in the foregoing embodiment, the fifth panel includes opposite first and second flanges project away from the base and engaged to the respective second and third panels.

In the alternative or additionally thereto, in the foregoing embodiment, a portion of the second and third panels are disposed directly between the base and the respective first and second legs.

In the alternative or additionally thereto, in the foregoing embodiment, the secondary portion includes a plurality of fasteners extending through the second and third panels for engaging the first and second legs to the base.

In the alternative or additionally thereto, in the foregoing embodiment, the secondary portion includes a plurality of fasteners extending through the second panel and the second face for engaging the first permanent magnet assembly to the first leg.

In the alternative or additionally thereto, in the foregoing embodiment, the first panel includes a plurality of access ports for accessing the plurality of fasteners.

A structure assembly for supporting, at least in-part, an elevator propulsion system configured to propel an elevator car in a lane, the structure assembly according to another, non-limiting, embodiment includes a plurality support structures distributed along a lane; and an elongated housing extending longitudinally along the lane and substantially encasing the plurality of support structures for structural rigidity.

Additionally to the foregoing embodiment, the plurality of support structures are girder-like.

In the alternative or additionally thereto, in the foregoing embodiment, the structure assembly is engaged to the elevator car.

In the alternative or additionally thereto, in the foregoing embodiment, the housing is filled with foam.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
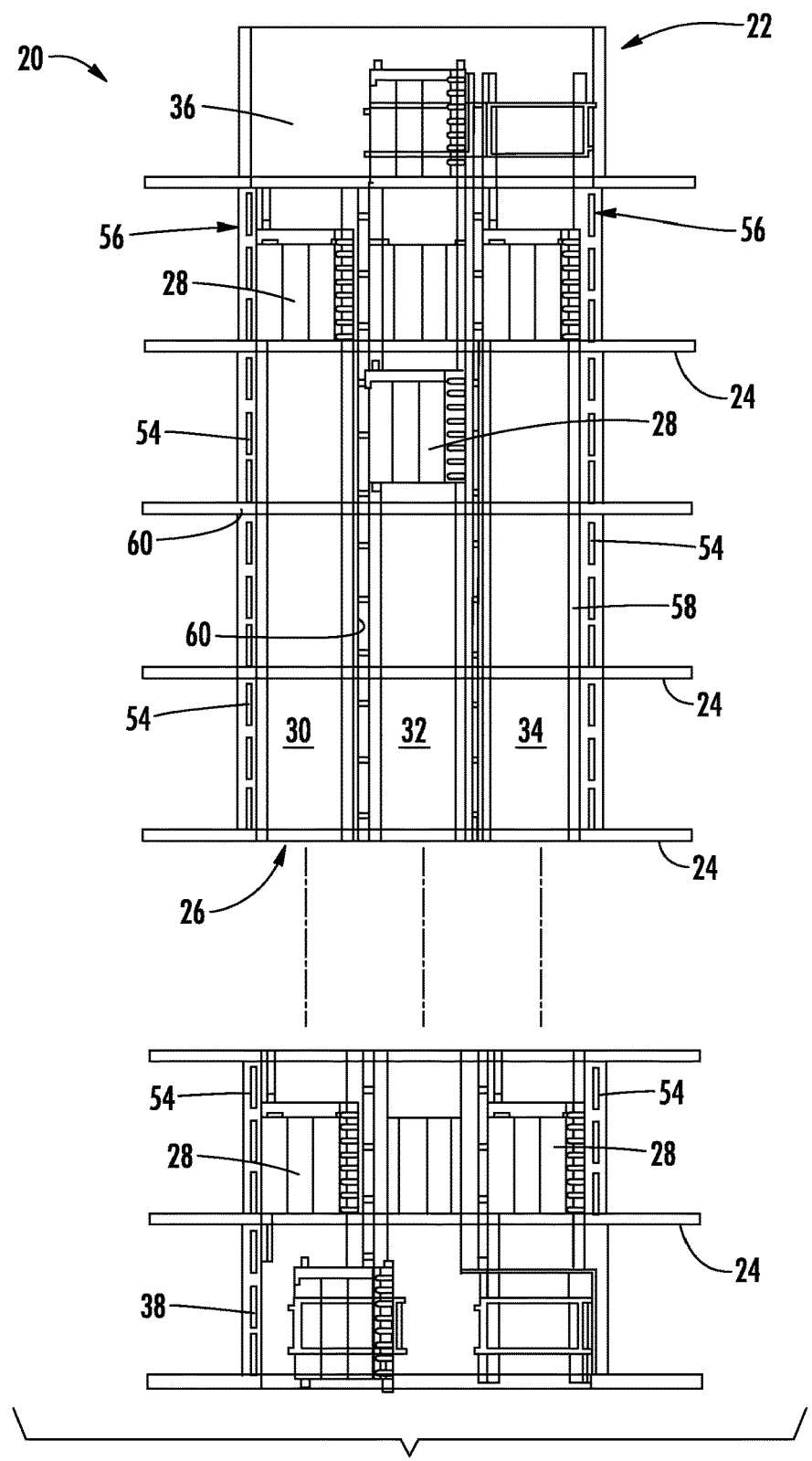
FIG. 1 depicts a multicar elevator system in an exemplary embodiment.

FIG. 1 depicts a self-propelled or ropeless elevator system 20 in an exemplary embodiment that may be used in a structure or building 22 having multiple levels or floors 24. Elevator system 20 includes a hoistway 26 defined by boundaries carried by the structure 22, and at least one car 28 adapted to travel in the hoistway 26. The hoistway 26 may include, for example, three lanes 30, 32, 34 with any number of cars 28 traveling in any one lane and in any number of travel directions (e.g., up and down). For example and as illustrated, the cars 28 in lanes 30, 34, may travel in an up direction and the cars 28 in lane 32 may travel in a down direction.

Above the top floor 24 may be an upper transfer station 36 that facilitates horizontal motion to elevator cars 28 for moving the cars between lanes 30, 32, 34. Below the first floor 24 may be a lower transfer station 38 that facilitates horizontal motion to elevator cars 28 for moving the cars between lanes 30, 32, 34. It is understood that the upper and lower transfer stations 36, 38 may be respectively located at the top and first floors 24 rather than above and below the top and first floors, or may be located at any intermediate floor. Yet further, the elevator system 20 may include one or more intermediate transfer stations (not illustrated) located vertically between and similar to the upper and lower transfer stations 36, 38.

Figure 2:
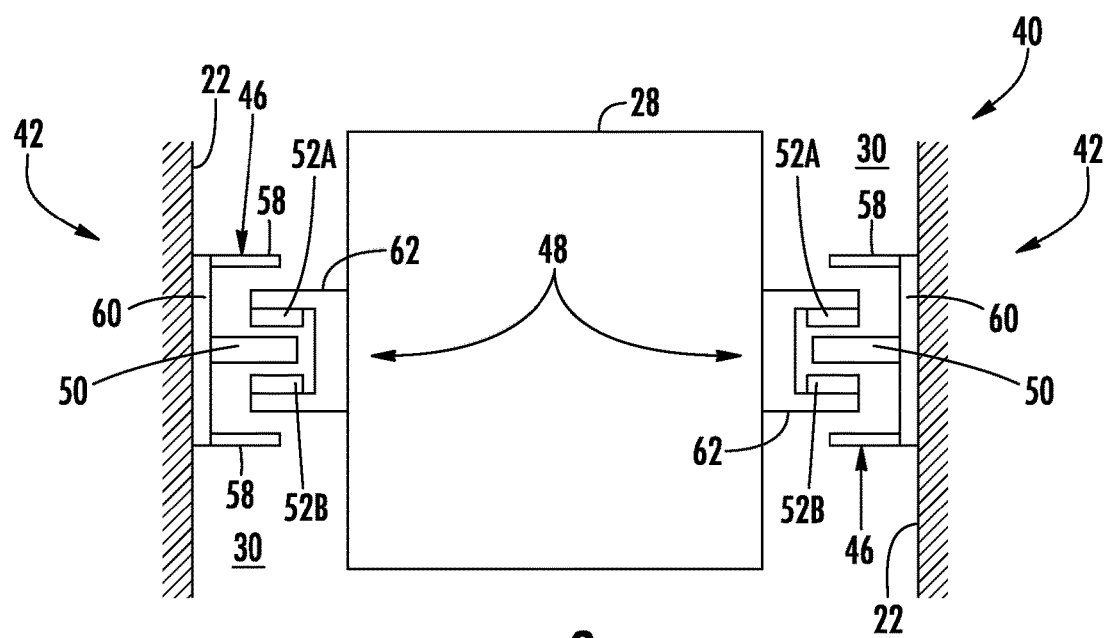
FIG. 2 is a top down view of a car and portions of a propulsion system in an exemplary embodiment.

Referring to FIGS. 1 and 2, the cars 28 are propelled using a propulsion system 40 such as a linear propulsion system. The propulsion system 40 may include two linear, magnetic, propulsion motors 42 that may be generally positioned on opposite sides of the elevator cars 28, and an electrical control system (not shown). Each motor 42 may include a fixed primary portion 46 generally mounted to the building 22, and a moving secondary portion 48 mounted to the elevator car 28. More specifically, the primary portions 46 may be located within the lanes 30, 32, 34 on walls or sides of the building 22 generally not associated with an elevator door.

Each primary portion 46 includes a plurality of windings or coils 50 (i.e. phase windings) that generally form a row extending longitudinally along and projecting laterally into each of the lanes 30, 32, 34. Each secondary portion 48 may include two rows of opposing permanent magnet assemblies 52A, 52B mounted to each car 28. The plurality of coils 50 of the primary portion 46 are generally located between and spaced from the opposing rows of permanent magnet assemblies 52A, 52B. It is contemplated and understood that any number of secondary portions 48 may be mounted to the car 28, and any number of primary portions 46 may be associated with the secondary portions 48 in any number of configurations. It is further understood that each lane may be associated with only one linear propulsion motor 42 or three or more motors 42. Yet further, the primary and secondary portions 46, 48 may be interchanged.

The secondary portion 48 operatively engages with the primary portion 46 to support and drive the elevators cars 28 within the lanes 30, 32, 34. Primary portion 46 is supplied with drive signals from one or more drives 54 of the control system to control movement of elevator cars 28 in their respective lanes through the linear, permanent magnet motor system 40. The secondary portion 48 operatively connects with and electromagnetically operates with the primary portion 46 to be driven by the signals and electrical power. The driven secondary portion 48 enables the elevator cars 28 to move along the primary portion 46 and thus move within a lane 30, 32, 34.

The primary portion 46 may be formed from a plurality of motor segments or modules 56, with each module associated with a drive 54 of the control system. Although not shown, the central lane 32 (see FIG. 1) also includes a drive for each module 56 of the primary portion 46 that is within the lane 32. Those with ordinary skill in the art will appreciate that although a drive 54 is provided for each motor module 56 of the primary portion 46 (one-to-one) other configurations may be used without departing from the scope of this disclosure.

Referring to FIG. 2, a view of the elevator system 20 including the elevator car 28 that travels in lane 30 is shown. The elevator car 28 may be guided by one or more guide rails 58 extending along the length of the lane 30, where the guide rails 58 may be affixed to a structural member 60 that may also support the coils 50 of the primary portion 46. The primary portion 46 may be mounted to the guide rail 58, incorporated into the guide rail 58, or may be located apart from guide rail 58 on structural member 60 (as shown). The primary portion 46 serves as a stator of a permanent magnet synchronous linear motor to impart force to elevator car 28. Coils 50 of motor modules 56 may be arranged in three phases, as is known in the electric motor art. One or more primary portions 46 may be mounted in the lane 30, to co-act with permanent magnet assemblies 52A, 52B mounted to the elevator car 28.

Figure 3:
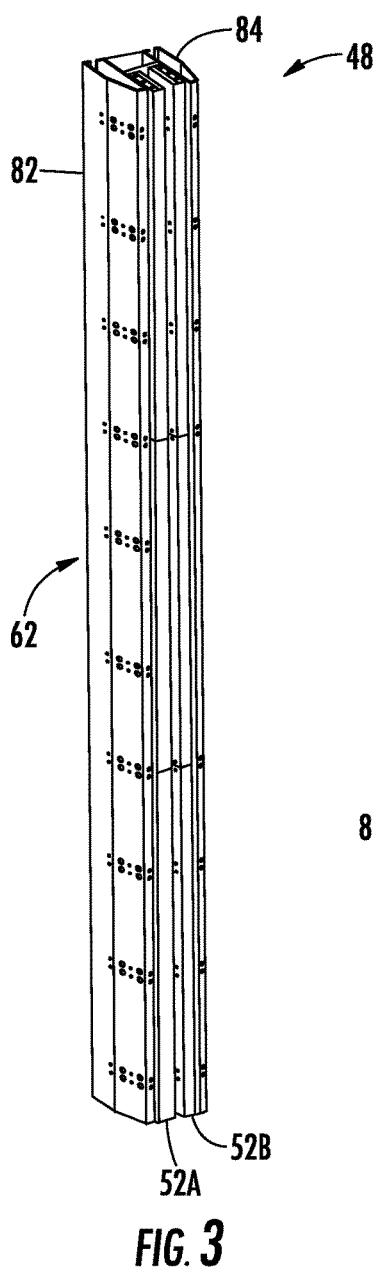
FIG. 3 is a perspective view of a secondary portion of the propulsion system.
Figure 4:
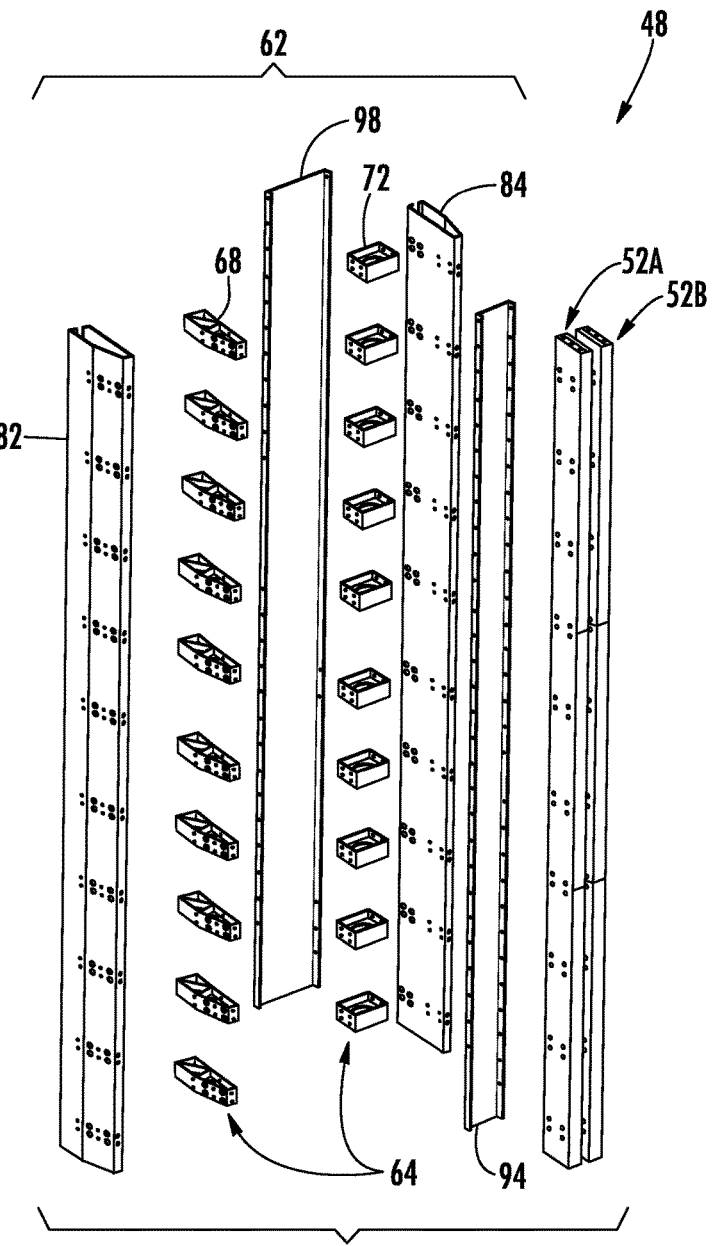
FIG. 4 is an exploded view of the secondary portion.

Referring to FIGS. 3 and 4, the secondary portion 48 extends longitudinally along the lane 30 and may include the permanent magnet assemblies 52A, 52B and an elongated structure assembly 62 both extending longitudinally alone the lane 30. The structure assembly 62 may be directly engaged to and spans laterally between the elevator car 28 and the permanent magnet assemblies 52A, 52B. The structure assembly 62 may include a plurality of support structures 64, and a housing 66. The support structures 64 may generally be C-shaped, contribute toward structural support of the permanent magnet assemblies 52A, 52B, and are spaced from one-another along the lane 30. The housing 66 may be elongated and extends longitudinally along the lane 30, and substantially envelopes a multitude of the support structures 64, thus contributing toward structural support of the permanent magnet assemblies 52A, 52B and adding rigidity to the overall secondary portion 48.

Referring to FIGS. 4 through 7, the support structure 64 may include first and second legs 68, 70 and a base 72. Each leg 68, 70 may be elongated and projects longitudinally outward from the elevator car 28 and into the lane 30 (see FIG. 7). The legs 68, 70 are spaced laterally from one-another by the base 72 that also projects outward from the elevator car 28 and into the lane 30, but by a distance that is substantially less than the longitudinal length of each leg 68, 70 that may be elongated. The legs 68, 70 and base 72 may generally be girder-like to facilitate strength and reduce weight. The first leg 68 may include substantially opposite first and second faces 74, 76 with the second face 76 partially facing and engaged to an end of the base 72. The second leg 70 may include substantially opposite third and fourth faces 78, 80 with the third face 78 partially facing and engaged to an opposite end of the base 72. The second and third faces 76, 78 may be substantially opposed to, and spaced from, one-another and generally support the respective permanent magnet assemblies 52A, 52B.

Figure 7:
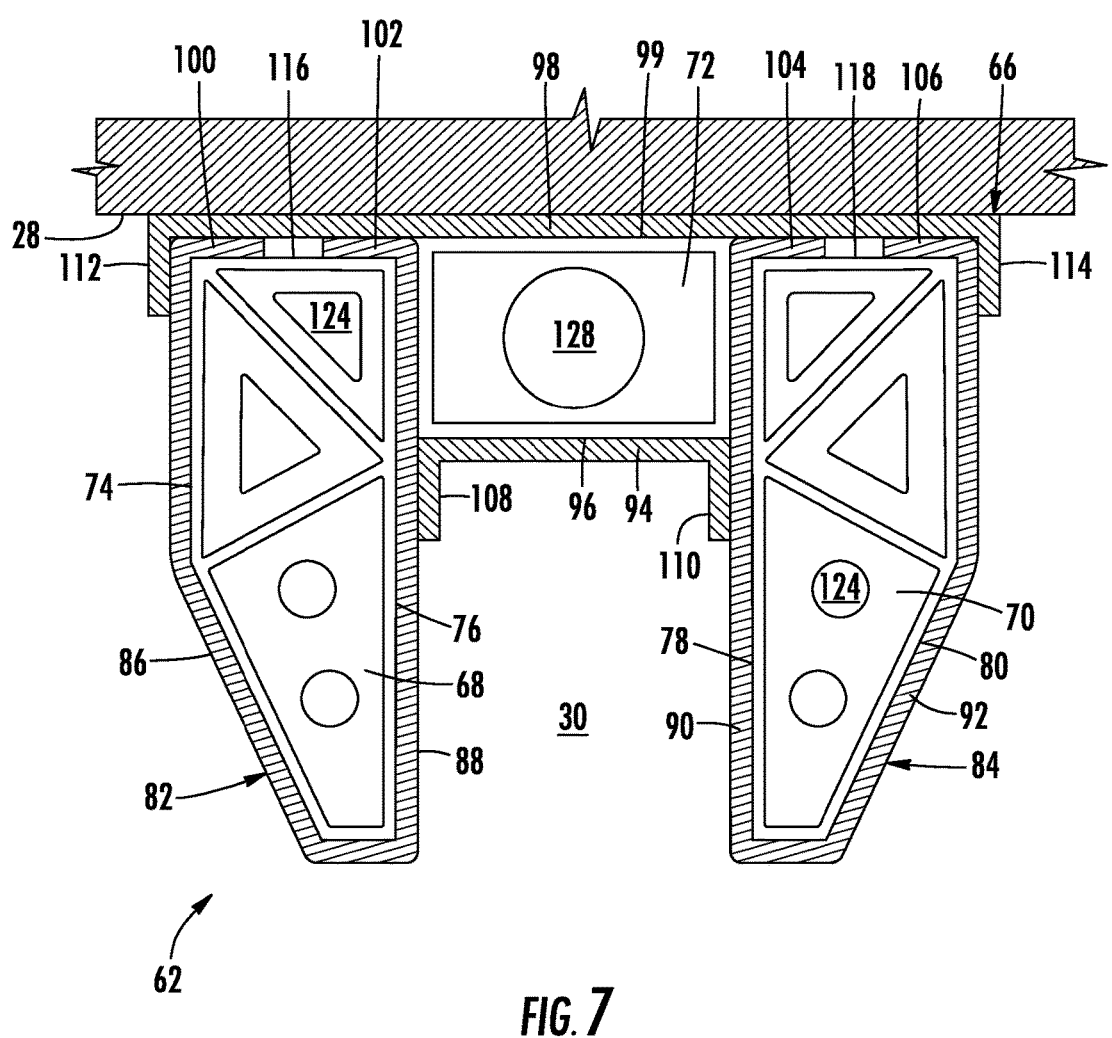
FIG. 7 is a cross section of the structure assembly.
Figure 8:
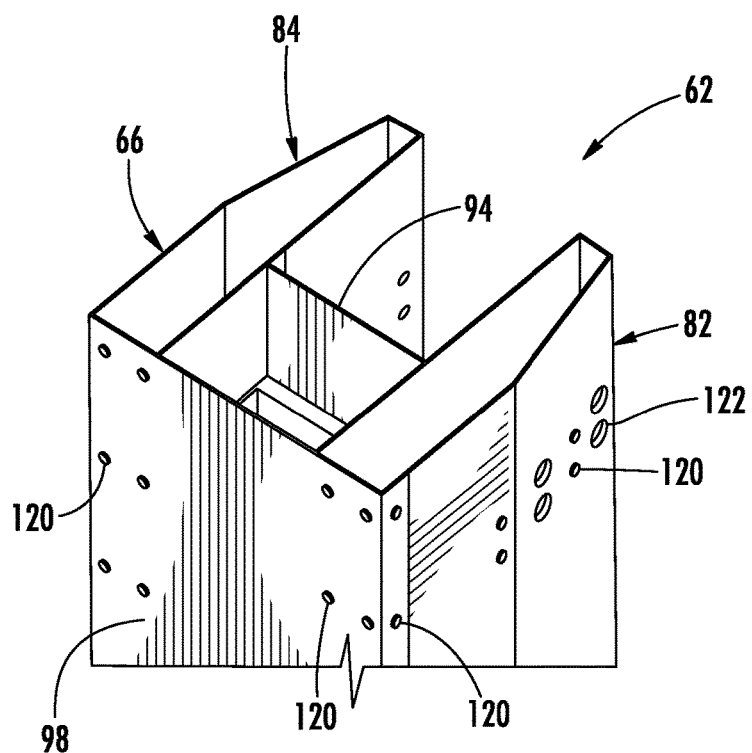
FIG. 8 is an enlarged rear perspective view of the structure assembly.
Figure 9:
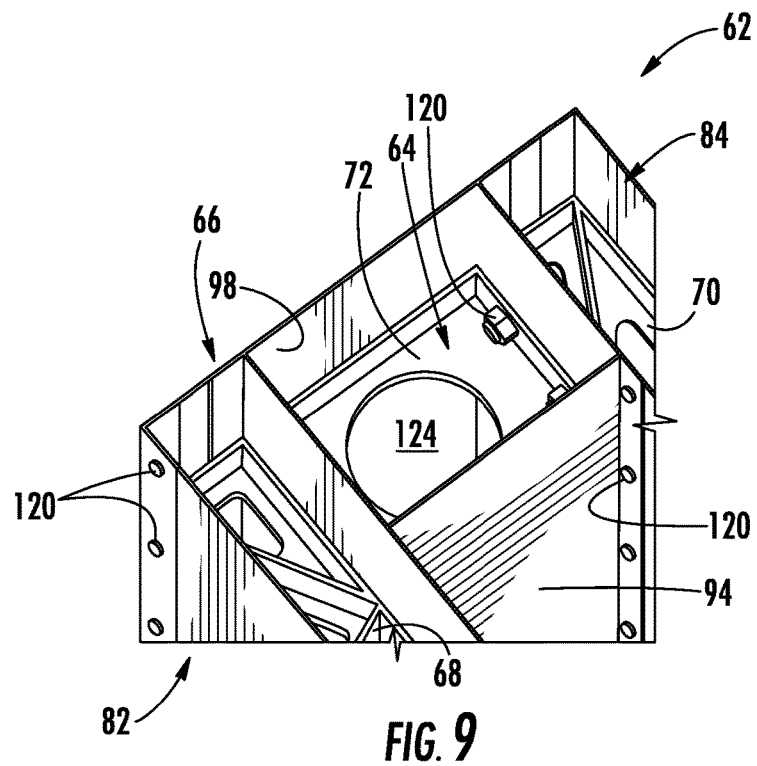
FIG. 9 is an enlarged frontal perspective view of the structure assembly.

Referring to FIG. 7, the housing 66 may include first and second members 82, 84 for substantially enveloping the respective first and second legs 68, 70. The members 82, 84 may generally be channel-like for covering the faces and distal ends of the legs 68, 70. More specifically, the first member 82 may include opposite first and second panels 86, 88, with the first panel 86 being directly adjacent and engaged to the first face 74 and the second panel being directly adjacent and engaged to the second face 76. Similarly, the second member 84 may include opposite third and fourth panels 90, 92 with the third panel 90 being directly adjacent and engaged to the third face 78 and the fourth panel 92 being directly adjacent and engaged to the fourth face 80. The housing 66 may further include a front or fifth panel 94 that extends longitudinally along the lane 30 and spans laterally between the first and second legs 68, 70. More specifically, the fifth panel 94 may be engaged to the second and third panels 88, 90 and may be directly engaged to an outward facing face 96 of the base 72. A sixth panel 98 of the housing 66 may extend longitudinally along the lane 30, is substantially located between the elevator car 28 and the support structure 64, and may be engaged directly to the elevator car 28. More specifically, the sixth panel 98 may be in direct contact with, and engaged to, a back face 99 of the base 72.

The first, second, third and fourth panels 86, 88, 90, 92 may each include respective flanges 100, 102, 104, 106 that may be elongated and extend longitudinally along the lane 30. The fifth panel 94 may include flanges 108, 110 that may be elongated and extend longitudinally along the lane 30, and the sixth panel 98 may include flanges 112, 114 that may be elongated and extend longitudinally along the lane 30. The flanges 100, 102, 104, 106, 108, 110, 112, 114 facilitate assembly of the structure assembly 62 and contribute toward overall rigidity. The flanges 100, 102 project laterally toward and may be spaced from one-another, and may be in direct contact with and disposed between the sixth panel 98 and a back face 116 of the first leg 68. Similarly, the flanges 104, 106 project laterally toward and may be spaced from one-another, and may be in direct contact with and disposed between the sixth panel 98 and a back face 118 of the second leg 70. The flanges 108, 110 of the fifth panel 94 may be spaced laterally apart and may both project laterally into the lane 30 and away from the elevator car 28. The flanges 108, 110 may be in direct contact with and engaged to the respective second and third panels 88, 90. The flanges 112, 114 of the sixth panel 98 may be spaced laterally apart and may both project laterally into the lane 30 and away from the elevator car 28. The flanges 112, 114 may be in direct contact with and engaged to the respective first and fourth panels 86, 92.

Referring to FIGS. 5-6 and 8-9, the various components of the structure assembly 62 may be engaged together via a plurality of fasteners 120. As examples, a plurality of fasteners 120 may extend through the flange 112, the panel 86 and the face 74 thereby engaging the sixth panel 98, the first panel 86 and the first leg 68 together. Similarly, a plurality of fasteners 120 may extend through the flange 114, the fourth panel 92 and the face 80, thereby engaging the sixth panel 98, the fourth panel 92 and the second leg 70 together. A plurality of fasteners 120 may extend through the sixth panel 98 the respective flanges 100, 102 of the member 82 and the back face 116, thereby securing the sixth panel 98, the member 82 and the first leg 68 together. A plurality of fasteners 120 may extend through the sixth panel 98 the respective flanges 104, 106 of the member 84 and the back face 118, thereby securing the sixth panel 98, the member 84 and the second leg 70 together. A plurality of fasteners 120 may extend through the flanges 108, 110 the respective second and third panels 88, 90 and the respective faces 76, 78, thereby securing the fifth panel 94, the second panel 88 and the first leg 68 together; and, thereby securing the fifth panel 94, the third panel 90 and the second leg 70 together. It is contemplated and understood that the fasteners 120 may include rivets, screws, bolts, and others, and/or any combination. Further embodiments of engagement techniques may include snap fits, adhesion, welding and others.

Figure 5:
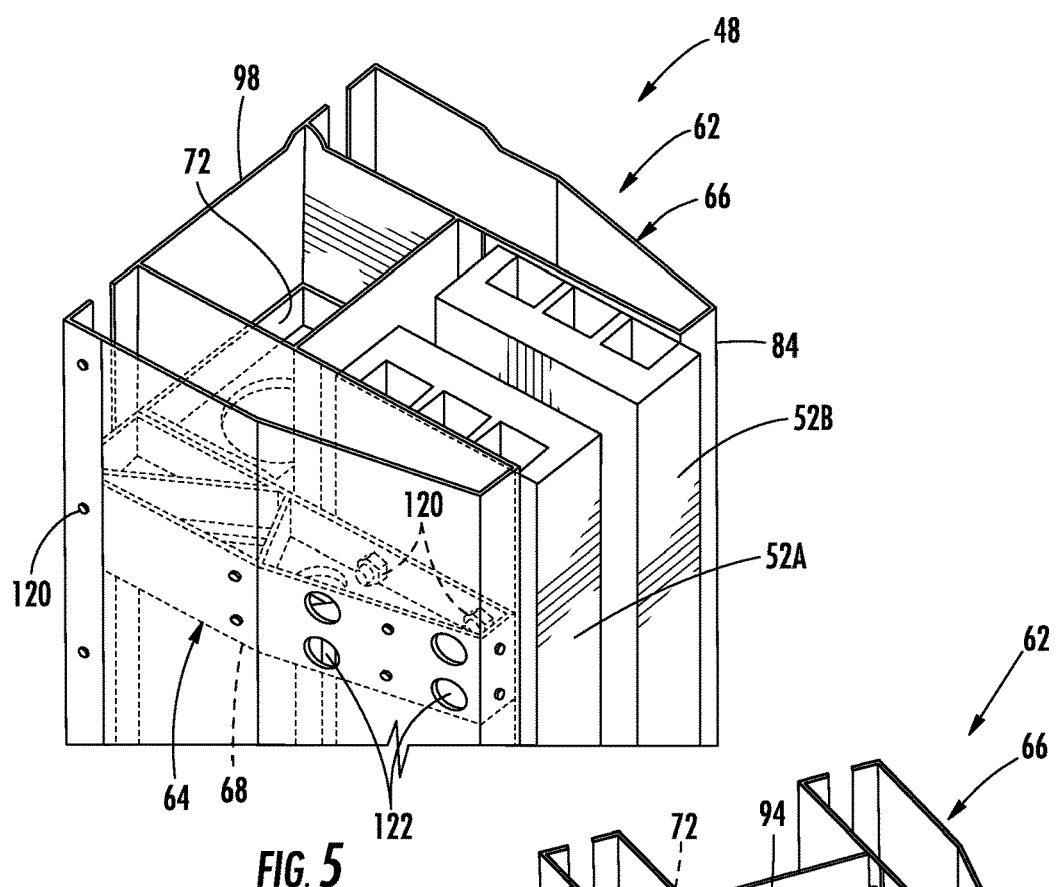
FIG. 5 is an enlarged perspective view of the secondary portion.
Figure 6:
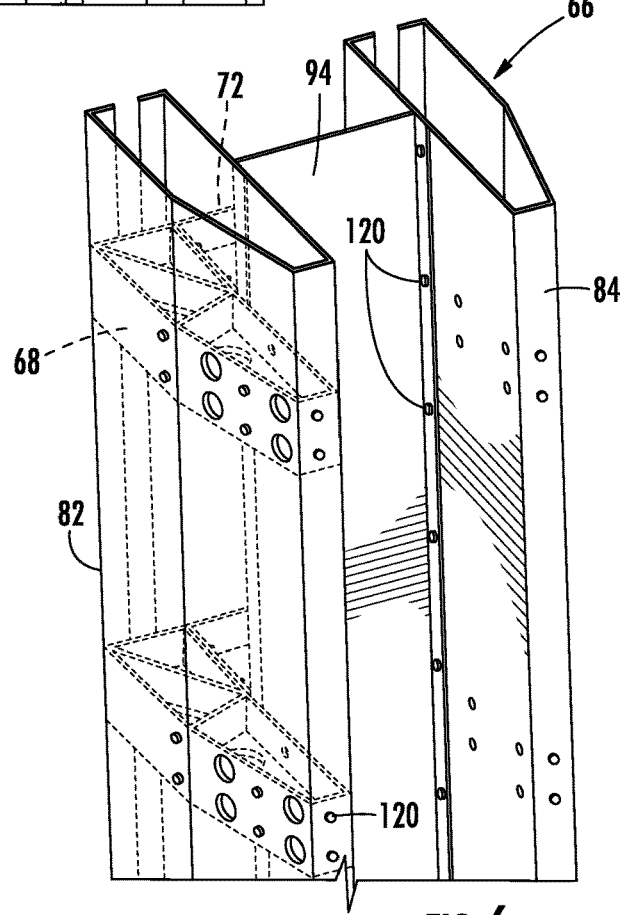
FIG. 6 is a perspective view of a structure assembly of the secondary portion.

As best shown in FIGS. 5 and 7, the permanent magnet assemblies 52A, 52B may be in direct contact with the respective second and third panels 88, 90 and engaged to the respective legs 68, 70 of the support structures 64 via fasteners 120 that may be a threaded bolt and nut. The bolts 120 may extend through the panels 88, 90 and through the respective faces 76, 78 to engage the assemblies to the respective legs 68, 70. To facilitate assembly and magnet maintenance, the first and fourth panels 86, 92 may include access ports 122 to access the nuts and/or bolts of the fasteners 120.

The structural strength of the structure assembly 62 may enable a dual function wherein the assembly may be part of the secondary portion 48 and also functions as an up-right structure for the carriage of the elevator car 28. Each support structure 64 may further include a plurality of holes 124 in a web portion 126 for reducing overall weight. The holes 124 may further enable the routing of signal and/or power wiring and other equipment and/or sensors within the housing 66. The cavity generally defined by the housing 66, and where the support structures 64 are located, may further be filled with a foam that may be closed-cell (e.g., polyurethane foam) or other light weight filler material to, for example, modify structural resonance frequencies, reduce noise and/or facilitate a reduction in the wall thickness of the housing 66. The support structures 64 may be made of a composite material or a light weight metal. The housing 66 may be made of a light weight metal such as aluminum or may be made of a carbon fiber and/or composite material.

It is further contemplated and understood that other configurations exist enabling encasement of a plurality of support structures 64 with a housing 66. It is understood that each support structure may be one piece or multiple pieces connected during assembly and is dependent upon the assembly process. Similarly, the housing 66 may be one piece or any other number of pieces or components and is dependent upon the orientation and configuration of the support structures and the assembly process.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A secondary portion of a linear electromagnetic propulsion system configured to propel an elevator car disposed in a hoistway defined by a stationary structure, the secondary portion comprising:
   a first permanent magnet assembly extending longitudinally along the hoistway;
   a plurality of support structures each engaged to and extending between the elevator car and the first permanent magnet assembly and spaced from one-another along the hoistway; and
   a housing extending between and substantially enveloping the plurality of support structures for structural support, wherein each one of the plurality of support structures include a first leg projecting outward from the elevator car for supporting the first permanent magnet assembly and each first leg includes substantially opposite first and second faces, and the housing includes a first member having a first panel engaged to the first face and a second panel engaged to the second face.

2. The secondary portion set forth in claim 1 further comprising:
   a second permanent magnet assembly extending longitudinally along the hoistway and spaced laterally away from the second permanent magnet assembly; and
   wherein each one of the plurality of support structures include a second leg projecting outward from the elevator car for supporting the second permanent magnet assembly and each second leg includes substantially opposite third and fourth faces, and the housing includes a second member having a third panel engaged to the third face and a fourth panel engaged to the fourth face.

3. The secondary portion set forth in claim 2, wherein the first and second permanent magnet assemblies are engaged to respective and opposing second and third panels.

4. The secondary portion set forth in claim 2, wherein each one of the plurality of support structures include a base engaged to and projecting between the first and second legs.

5. The secondary portion set forth in claim 4, wherein the housing includes a fifth panel extending longitudinally along the hoistway, spanning laterally between the second and third panels and engaged to each one of the bases of the plurality of support structures.

6. The secondary portion set forth in claim 5, wherein the fifth panel is engaged to the second and third panels.

7. The secondary portion set forth in claim 6, wherein the housing includes a sixth panel extending longitudinally along the hoistway, and engaged to and disposed between the plurality of support structures and the elevator car.

8. The secondary portion set forth in claim 7, wherein the first and second members are substantially channel-shaped.

9. The secondary portion set forth in claim 8, wherein the sixth panel includes opposite first and second flanges projecting away from the elevator car and engaged to the respective first and fourth panels.

10. The secondary portion set forth in claim 8, wherein the fifth panel includes opposite first and second flanges project away from the base and engaged to the respective second and third panels.

11. The secondary portion set forth in claim 8, wherein a portion of the second and third panels are disposed directly between the base and the respective first and second legs.

12. The secondary portion set forth in claim 11 further comprising:
   a plurality of fasteners extending through the second and third panels for engaging the first and second legs to the base.

13. The secondary portion set forth in claim 1 further comprising:
   a plurality of fasteners extending through the second panel and the second face for engaging the first permanent magnet assembly to the first leg.

14. The secondary portion set forth in claim 13, wherein the first panel includes a plurality of access ports for accessing the plurality of fasteners.

* * * * *